United States Patent
Hirata et al.

(10) Patent No.: US 7,335,328 B2
(45) Date of Patent: Feb. 26, 2008

(54) METHOD FOR MANUFACTURING MULTILAYER CERAMIC CAPACITOR

(75) Inventors: Kazuki Hirata, Osaka (JP); Kenji Oka, Chitose (JP); Kazuhiro Komatsu, Chitose (JP); Atsuo Nagai, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 650 days.

(21) Appl. No.: 10/502,602

(22) PCT Filed: Oct. 24, 2003

(86) PCT No.: PCT/JP03/13668

§ 371 (c)(1),
(2), (4) Date: Jul. 27, 2004

(87) PCT Pub. No.: WO2004/038744

PCT Pub. Date: May 6, 2004

(65) Prior Publication Data

US 2005/0116393 A1  Jun. 2, 2005

(30) Foreign Application Priority Data

Oct. 28, 2002 (JP) .............................. 2002-312447

(51) Int. Cl.
*H01G 4/00* (2006.01)
*C04B 33/32* (2006.01)
(52) U.S. Cl. ...................... 264/615; 264/642
(58) Field of Classification Search ................ 264/614, 264/615, 642, 605; 361/321.2
See application file for complete search history.

(56) References Cited

U.S. PATENT DOCUMENTS

| | | | |
|---|---|---|---|
| 6,511,564 B2 * | 1/2003 | Nakamura et al. | 156/89.16 |
| 6,521,686 B1 * | 2/2003 | Erny | 524/413 |
| 6,947,276 B2 * | 9/2005 | Hirata et al. | 361/306.3 |

FOREIGN PATENT DOCUMENTS

| | | |
|---|---|---|
| JP | 9-169564 | 6/1997 |
| JP | 10-87372 | 4/1998 |
| JP | 10-335171 | 12/1998 |
| JP | 10338524 A * | 12/1998 |
| JP | 2000-203941 A | 7/2000 |
| JP | 2002-226263 | 8/2002 |

* cited by examiner

*Primary Examiner*—Carlos Lopez
(74) *Attorney, Agent, or Firm*—McDermott Will & Emery LLP

(57) ABSTRACT

A method of manufacturing a multilayer ceramic capacitor includes the steps of: preparing a mixture of a raw material powder mainly composed of barium titanate particles; forming the mixture and a binder into a green sheet; alternately layering the green sheet and an internal electrode to obtain a laminated body; and sintering the laminated body. The step of preparing the mixture includes the steps of: introducing the raw material powder and the dispersion medium into a mixing container, and stirring them with balls serving as a mixing medium, to obtain a slurry containing a raw material powder mixture; and drying the slurry. The mixing medium has a diameter that is equal to or less than 400 times the mean particle size of the barium titanate particles of the raw material. The present invention provides a multilayer ceramic capacitor having good DC bias characteristics by suppressing the variation in crystal particles.

12 Claims, 1 Drawing Sheet

METHOD FOR MANUFACTURING MULTILAYER CERAMIC CAPACITOR

TECHNICAL FIELD

The present invention relates to a method of manufacturing a multilayer ceramic capacitor.

BACKGROUND ART

Recently, it has been required to reduce the size of multilayer ceramic capacitors while enlarging their capacitance. To meet this requirement, the thickness of the dielectric layers must be reduced by using a raw material powder with a small particle size.

The capacitance of multilayer ceramic capacitors is measured with an AC voltage, not a DC voltage. However, a DC voltage is inevitably applied in actual use, and this application of a DC voltage causes a decrease in the capacitance of most capacitors. The decreased rate of the capacitance caused by the application of a DC voltage is referred to as DC bias characteristics, and there is a demand for capacitors having good DC bias characteristics.

Prior art multilayer ceramic capacitors are manufactured as follows.

First, barium titanate powder, which is the main component, and powders of metal oxides, which are sub-components and micro-additives, are mixed with a dispersion medium of water and a mixing medium of zirconia balls, to form a slurry in which barium titanate and the metal oxides are homogeneously dispersed.

Next, the slurry has the zirconia balls removed and is dried, to obtain a powder mixture.

Subsequently, this powder mixture is mixed with organic substances such as a binder and a plasticizer, to produce ceramic green sheets.

Thereafter, the ceramic green sheets and internal electrodes are alternately layered, and the laminate is sintered. Lastly, external electrodes are formed, to obtain a multilayer ceramic capacitor.

As the prior art pertinent to this kind of multilayer ceramic capacitor, for example, Japanese Laid-Open Patent Publication No. 2002-226263 is known.

Regarding the above-mentioned manufacturing method, this prior art proposes providing grain-growth-inhibiting particles at the grain boundary of crystal grains of barium titanate, to obtain good DC bias characteristics. This proposal uses, for example, zirconia balls with a diameter of 3 mm as the mixing medium when barium-zirconium titanate powder having a mean particle size of 0.3 µm is mixed with additives. However, since these zirconia balls are large in both diameter and mass, an excessive force is applied to the barium-zirconium titanate powder and the additives upon mixing, thereby resulting in excessive grinding.

If the barium-zirconium titanate powder or the barium titanate powder, which is the main component, is excessively ground, the particle size of the powder varies greatly. In addition, the excessively ground small particles facilitate grain growth during sintering, so that the particle size of the resultant crystal particles becomes large.

When a DC voltage is applied to a multilayer ceramic capacitor including such large crystal particles, a problem of deterioration of the DC bias characteristics arises.

Accordingly, by suppressing the variation in crystal particles, the present invention aims to provide a multilayer ceramic capacitor having good DC bias characteristics.

DISCLOSURE OF INVENTION

A raw material powder mainly composed of barium titanate particles and a dispersion medium are stirred with a mixing medium to form a slurry containing a raw material powder mixture, and the slurry is dried to obtain the raw material powder mixture. At this time, the present invention uses a mixing medium having a smaller diameter than the conventional one, thereby suppressing the excessive grinding of the barium titanate due to the application of an excessive force. The method of the present invention suppresses the variation in the particle size of the crystal particles, so that it is possible to obtain a multilayer ceramic capacitor having good DC bias characteristics.

The present invention provides a method of manufacturing a multilayer ceramic capacitor, comprising: the first step of introducing a raw material powder mainly composed of barium titanate particles and a dispersion medium into a mixing container, and stirring them with balls serving as a mixing medium, to obtain a slurry containing a raw material powder mixture; the second step of drying the slurry, to obtain the raw material powder mixture; the third step of forming the raw material powder mixture and a binder into a green sheet; the fourth step of alternately layering the green sheet and an internal electrode, to obtain a laminated body; and the fifth step of sintering the laminated body. The mixing medium has a diameter that is equal to or less than 400 times the mean particle size of the barium titanate particles before the first step.

BEST MODE FOR CARRYING OUT THE INVENTION

Figure 1:
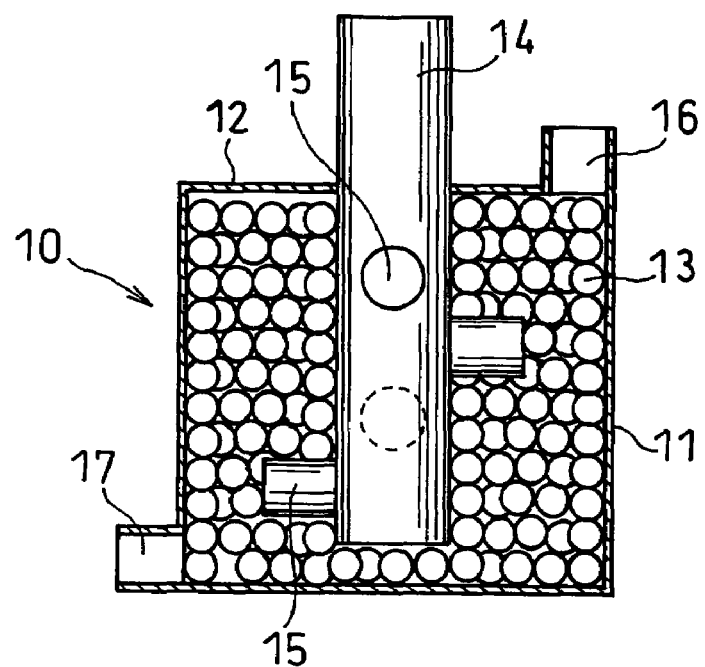
FIG. 1 is a longitudinal sectional view of a mixing container for performing a mixing step in Embodiments of the present invention.

The present invention regulates the diameter of the mixing medium of balls that are used for homogeneously mixing a raw material powder mainly composed of barium titanate particles, i.e., a raw material powder consisting of barium titanate particles and sub-component particles of metal oxides.

The present invention uses, as the mixing medium, balls having a diameter that is equal to or less than 400 times the particle size of the barium titanate particles of the raw material.

The particle size of the barium titanate particles of the raw material is preferably 0.1 to 1.0 µm, and more preferably 0.1 to 0.5 µm. The diameter of the mixing medium is preferably 200 µm or less. It is more preferably 100 µm or less, and still more preferably 50 µm or less. Also, for the convenience of separating the mixing medium from the raw material powder mixture after the mixing of the raw material powder, the diameter of the mixing medium is preferably at least 50 times the particle size of the barium titanate particles of the raw material, specifically about 25 µm.

The amount of the dispersion medium is preferably 1 to 3 times the volume of the raw material powder. By regulating the amount of the dispersion medium in the above range, it is possible to suppress the increase in the variation in the crystal particle size of the resultant dielectric layers caused by the agglomeration of the raw material powder.

In the first step, the surface of the raw material powder is preferably coated with the dispersion medium, i.e., moistened with the dispersion medium, before being brought into contact with the mixing medium. This can suppress the excessive grinding of barium titanate due to the application of an excessive force, and improve the dispersibility of the raw material powder.

In the first step, the temperature of the dispersion medium is preferably 50° C. or less. This can suppress the change in energy applied to the raw material powder.

In the first step, the amount of the mixing medium preferably constitutes 60 to 74% of the internal volume of the mixing container. In this case, the barium titanate particles and the sub-component particles of metal oxides of the raw material powder can be effectively mixed with each other.

In the second step, the drying temperature is preferably 120° C. or less. In this case, the agglomeration of the raw material powder can be suppressed, and the variation in the particle size of the crystal particles can be reduced.

It is preferable that the second step further include the step of dehydrating the slurry before the drying. In this case, the agglomeration of the raw material powder can be suppressed, and the variation in the particle size of the crystal particles can be reduced.

It is preferable that the method further include, between the second step and the third step, the steps of: calcining the mixture; stirring the calcined mixture, with a dispersion medium and a grinding medium having a diameter that is equal to or less than 400 times the mean particle size of the barium titanate of the raw material, to obtain a slurry containing a calcined powder; and drying the slurry, to obtain the calcined powder. Accordingly, the main-component barium titanate and the sub-components change moderately, so that it is possible to reduce the variation in the particle size of the crystal particles.

The grinding medium may have a diameter that is equal to or larger than the diameter of the mixing medium used in the first step, but the diameter is preferably 200 µm or less, in order to suppress the excessive grinding of the calcined powder.

The calcined powder preferably has a specific surface area that is 0.5 to 1 time the specific surface area of the barium titanate particles of the raw material. In this case, the dielectric layer after the sintering is composed of crystal particles having a desired particle size.

The third step preferably includes the steps of: stirring the raw material powder mixture, an organic binder and a solvent thereof, with a third mixing medium having a diameter that is equal to or less than 400 times the mean particle size of the barium titanate of the raw material, to obtain a slurry; and forming a green sheet from the slurry. By suppressing the excessive grinding of the barium titanate due to the application of an excessive force, i.e., by suppressing the variation in the particle size of the crystal particles, it is possible to obtain a multilayer ceramic capacitor having good DC bias characteristics.

The present invention is now described by way of embodiments.

EMBODIMENT 1

FIG. 1 is a longitudinal sectional view of a mixing container for performing a mixing step in this embodiment. A mixing container 10 includes a cylindrical container 11 and a cover 12 that seals the upper opening thereof, and is filled with zirconia balls 13, which are a mixing medium. Reference character 14 is a stirring rod which is inserted in the mixing container through the cover 12 and has a plurality of stirring parts 15. The cover 12 has a sample inlet 16. The container 11 has a sample outlet 17 at its side face.

Figure 2:
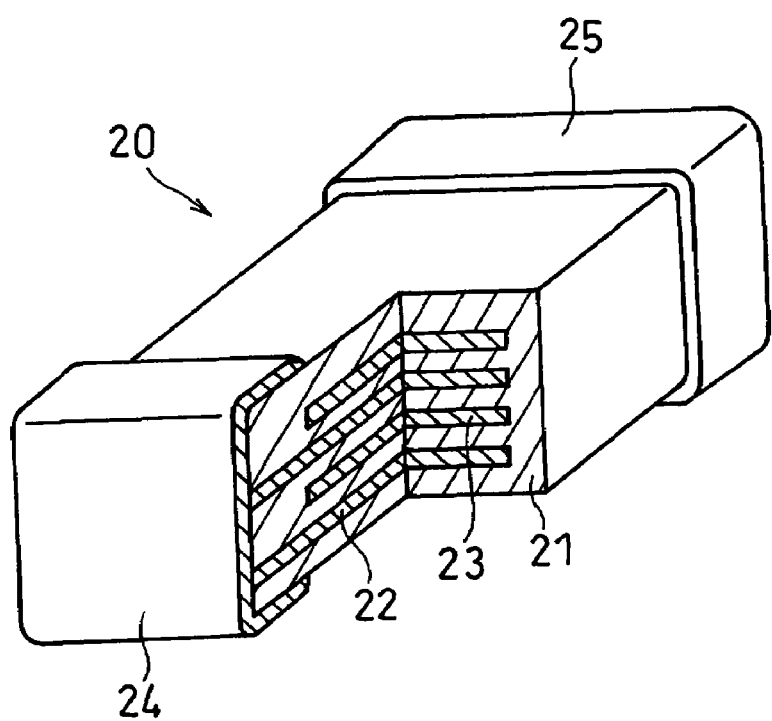
FIG. 2 is a partially cut-away perspective view of a multilayer ceramic capacitor 20 obtained in Embodiments of the present invention.

FIG. 2 is a partially cut-away perspective view of a multilayer ceramic capacitor 20 obtained in this embodiment. Reference character 21 represents a dielectric layer composed mainly of barium titanate, 22 and 23 represent internal electrodes, and 24 and 25 represent external electrodes connected to the internal electrodes 22 and 23, respectively.

The manufacturing process of a multilayer ceramic capacitor is now described.

First, the starting material of the dielectric layer is weighed in the following ratio. Per 100 mol of barium titanate, 1.0 mol of MgO, 0.3 mol of $Dy_2O_3$, 0.3 mol of $Ho_2O_3$, 0.6 mol of $SiO_2$, and 0.05 mol of $Mn_3O_4$ are weighed as sub-components. Barium titanate particles having mean particle sizes of 0.50 µm and 0.32 µm are used. Also, the mean particle size of the sub-components is 0.1 µm or less, and there may be some particles having a mean particle size of several nm.

Next, the starting material particles are mixed, water is added as a dispersion medium, and the mixture is further mixed to coat the surface of the starting material particles with water.

If the amount of water is too small, the dispersibility of the raw material powder deteriorates, and if it is excessive, the agglomeration of particles is likely to occur in the drying step. Therefore, the amount of the dispersion medium is desirably 1 to 3 times the volume of the starting material. In addition to the dispersion medium, a dispersant capable of enhancing the dispersibility of the raw material powder may be added.

Next, the mixing step is described.

As illustrated in FIG. 1, the mixing container 10 has the rotatable stirring rod 14 therein, and is most closely packed with the zirconia balls 13 having a mean particle size of 200 µm, i.e., in the state of closest packing. The zirconia balls 13 occupy about 70% of the internal volume of the mixing container 10 excluding the volume of the stirring rod 14. The volume of the mixing container 10 is, for example, 0.5 liter.

While the stirring rod 14 is rotated at a predetermined speed, for example, a peripheral speed of 1 m/sec to 10 m/sec, the mixture of the water and the raw material powder is introduced from the inlet 16 into the mixing container 10 at a predetermined speed, for example, 0.1 to 1.0 liter/min. The mixture of the water and the raw material powder passes through the gaps between the zirconia balls 13 and flows out of the outlet 17. In this way, by passing through the mixing container, a slurry having excellent dispersibility can be obtained. The inlet 16 and the outlet 17 of the mixing container 10 are provided with a filter (not shown), so that foreign matter does not enter the mixing container 10 and only the slurry comes out of the outlet 17.

In the mixing container, the raw material powder including barium titanate collides with the zirconia balls and is ground a little. However, since the diameter of the zirconia balls is much smaller than that of the conventional ones, the excessive grinding of barium titanate due to the application of an excessive impact can be suppressed.

In order to obtain the slurry with good productivity, it is desirable to pack the mixing container 10 with spherical zirconia balls most closely. When packed most closely, the zirconia balls theoretically occupy 74% of the internal volume of the mixing container 10. If the zirconia balls occupy less than 60% of the internal volume of the mixing container 10, the powder cannot be mixed sufficiently, resulting in poor dispersibility. Multilayer ceramic capacitors obtained from such raw material powder has poor reliability.

Therefore, the zirconia balls 13 should occupy 60 to 74% of the internal volume of the mixing container 10 (excluding the volume of the stirring rod), and preferably 70 to 74%.

Also, the rotating speed of the stirring rod 14 and the introducing speed of the mixture are controlled such that an excessive force will not apply to the barium titanate. For example, the peripheral speed of the stirring rod is set to about 6 m/sec, and the introducing speed of the mixture is set to about 0.3 to 0.5 liter/min.

Subsequently, the slurry is filtered for dehydration and dried in a drying room of which room temperature is 120%. When the dehydration is performed before the drying, the agglomeration of the raw material powder during drying can be suppressed. When the drying is performed in the drying room of the room temperature of 120% or less, the agglomeration due to rapid evaporation of moisture can be suppressed. At 120° C. or less, the agglomeration of the raw material powder can be suppressed, but drying takes a long time if the temperature is low. Thus, the drying is preferably performed at 100 to 120° C.

Thereafter, the dried powder is calcined in air at 800 to 1,000° C. For the calcination temperature, optimum temperatures are selected depending on the composition.

The calcination temperature and time are set such that the reaction between the barium titanate and the sub-components can be confirmed by X-ray diffraction of the obtained calcined powder. However, the specific surface area of the powder after the calcination and grinding is set to 0.5 to 1 time the specific surface area of the starting material of barium titanate, and the calcination temperature and time are controlled so as not to produce large amounts of agglomerated powder.

The calcination causes not only the above-mentioned reaction but also a partial reaction between the raw material particles. Thus, the reacted particles are ground. With respect to the amount of dispersion medium of the water added in grinding, if it is too small, the dispersibility of the calcined powder deteriorates, and if it is excessive, the agglomeration of the powder is likely to occur in the drying step. Therefore, the amount of the dispersion medium added is desirably 1 to 3 times the volume of the calcined powder. In addition to the dispersion medium, a dispersant capable of enhancing the dispersibility of the calcined powder may be added.

The grinding of the calcined powder is performed using the container 10 as illustrated in FIG. 1. At this time, the calcined powder collides with the zirconia balls 13 and is ground. However, since the diameter of the zirconia balls is much smaller than that of the conventional ones, the excessive grinding of the calcined powder due to the application of an excessive impact can be suppressed.

The calcined powder is a powder which has reacted to some extent, so there is a high possibility that it has a larger particle size than that of the starting material. In order to grind/mix the calcined powder properly, it is therefore desirable to use zirconia balls of which size is equal to or larger than that used for mixing the starting material, and preferably 200 μm or less.

Also, in order to obtain the slurry with good productivity, it is desirable to pack the mixing container 10 with the zirconia balls 13 most closely. When packed most closely, the zirconia balls theoretically occupy 74% of the internal volume of the mixing container 10. If the zirconia balls occupy less than 60% of the internal volume of the mixing container 10, the powder cannot be mixed sufficiently, resulting in poor dispersibility. Multilayer ceramic capacitors obtained from such raw material powder has poor reliability.

The zirconia balls used in this step should occupy 60 to 74% of the internal volume of the mixing container 10, and preferably 70 to 74%.

The rotating speed of the stirring rod 14 and the introducing speed of the mixture are controlled such that an excessive force will not apply to the barium titanate.

Subsequently, the slurry is filtered for dehydration and dried in a drying room of which room temperature is 120° C. The dehydration before the drying can suppress the agglomeration during drying. The drying is preferably performed at a room temperature of 120° C. or less in the same manner as the first mixing step, and more preferably at 100 to 120° C.

By employing such drying temperatures, it is possible to effectively obtain dielectric layers composed of crystal particles having a small variation in particle size.

Next, using this dried calcined powder, a slurry for forming green sheets is prepared.

First, this calcined powder is mixed with alcohol, such as ethanol, to cover the surface of the calcined powder particles with the alcohol.

The calcined powder is then mixed with a solvent of n-butyl acetate, a plasticizer of benzyl butyl phthalate, and a binder of polyvinyl butyral resin, to obtain a slurry.

In this way, by coating the surface of the calcined powder particles with alcohol before mixing it with the solvent, plasticizer, and binder, the agglomeration of the calcined powder particles can be suppressed.

If the amount of the alcohol used therein is excessive, desired ceramic green sheets cannot be obtained. Therefore, the amount of alcohol added is set so as to be able to suppress the agglomeration of the calcined powder particles and coat the surface thereof. This amount is set to less than the total amount of the solvent, plasticizer, and binder.

Next, the above-mentioned slurry is applied onto an appropriate substrate, such as a sheet of polyethylene terephthalate, by the doctor blade process, to form a ceramic green sheet which serves as a dielectric layer.

An internal electrode paste of Ni powder having a mean particle size of about 0.4 μm is screen-printed in a desired pattern on one face of the ceramic green sheet.

Two kinds of ceramic green sheets, with internal electrodes of different patterns printed thereon, are alternately layered, heated, and pressed for integration. In this case, the heating temperature is 80 to 140° C., and the pressure is 100 to 200 kgf/cm$^2$. This sheet is cut into a size of 2.4 mm wide and 1.3 mm long, to obtain a non-sintered laminated body.

The non-sintered laminated body is then put into a zirconia case with zirconia powder spread at its bottom, and heated to 350° C. in an atmosphere furnace with a current of nitrogen to burn the organic binder. Subsequently, it is sintered in a current of a mixture gas of nitrogen and hydrogen at 1,100 to 1,300° C., to obtain a sintered body. In the following example, it was sintered at 1,250° C. for 2 hours.

Thereafter, a copper paste is applied to end faces of the obtained sintered body where the internal electrodes are exposed. The sintered body with the paste is baked in a nitrogen atmosphere in a mesh-type continuous belt furnace at 900° C., obtain a multilayer ceramic capacitor as illustrated in FIG. 2.

By the above-described manufacturing steps, multilayer ceramic capacitors were manufactured by using two kinds of barium titanate having mean particle sizes of 0.50 μm and 0.32 μm, and varying the diameter of the zirconia balls used for mixing the barium titanate of each particle size with the sub-components to 500 μm, 200 μm, 100 μm, and 50 μm. The DC bias characteristics of the multilayer ceramic capacitors thus obtained were measured, and the results thereof are shown in Table 1. In grinding the calcined powder and preparing the slurry for forming the green sheets, zirconia balls having a diameter of 500 μm were used.

TABLE 1

| Sample No. | Mean particle size of barium titanate (μm) | Mean diameter of zirconia balls (μm) | DC bias characteristics (%) |
|---|---|---|---|
| 1 | 0.50 | 500 | −53.8 |
| 2 | 0.50 | 200 | −28.4 |
| 3 | 0.50 | 100 | −23.3 |
| 4 | 0.50 | 50 | −19.8 |
| 5 | 0.32 | 500 | −48.1 |
| 6 | 0.32 | 200 | −32.5 |
| 7 | 0.32 | 100 | −18.9 |
| 8 | 0.32 | 50 | −14.8 |

DC bias characteristics were measured as follows. First, the multilayer ceramic capacitor was retained at 150° C. for 1 hour, and then retained at 20° C. for 24 hours. Subsequently, without applying a DC voltage, the capacitance was measured. Thereafter, upon application of a DC voltage of 3.15 V to the same sample, the capacitance was measured. The decreased rate of this measured value relative to the value before the application of the DC voltage was used for DC bias characteristics.

According to Table 1, as in samples No. 2 to 4, 7, and 8, when the diameter of the zirconia balls is equal to or less than 400 times the mean particle size of the raw material barium titanate, the DC bias characteristics are equal to or less than −30%, which is good. That is, the dielectric layers thereof are composed of small crystal particles with a small variation in particle size. Also, the smaller the diameter of the zirconia balls used for mixing, the better the DC bias characteristics.

When the DC bias characteristics are greater than −30%, the designed circuit constant varies significantly, so that desired circuit characteristics cannot be obtained. Therefore, this is not preferable in terms of the use in actual circuits.

However, as in samples No. 1, 5, and 6, when the diameter of the zirconia balls is larger than 400 times the mean particle size of the barium titanate, the DC bias characteristics are greater than −30%, which is not preferable in terms of the characteristics as the capacitor. This is because the excessive grinding of the barium titanate during mixing facilitates the grain growth of the dielectric layers while sintering, thereby resulting in an increase in the variation in the particle size of the crystal particles.

Therefore, in order to obtain multilayer ceramic capacitors having good DC bias characteristics, it is important that the particle size of the barium titanate used as the starting material and its variation are as equivalent to the particle size of the raw material powder after the wet mixing and drying and its variation as possible.

Also, the smaller the mean particle size of the barium titanate, the more remarkable the effects. Therefore, as described in the above embodiment, it is effective to give special consideration to the size of the zirconia balls, in order to suppress the excessive grinding during the mixing of the raw material powder without impairing the dispersibility. Therefore, the zirconia balls used for the wet mixing of the powder, i.e., the mixing medium, should have a diameter that is equal to or less than 400 times the mean particle size of the starting material barium titanate. Specifically, it is desirable to use small balls having a diameter of 200 μm or less, preferably 100 μm or less, and more preferably 50 μm or less.

Next, multilayer ceramic capacitors were manufactured by setting the diameter of the zirconia balls used for the mixing to 50 μm and varying the size of the zirconia balls used for the grinding of the calcined powder. Their DC bias characteristics were measured, and the results thereof are shown in Table 2. Sample Nos. 4A to 4D use barium titanate powder having a mean particle size of 0.50 μm, and sample Nos. 8A to 8D use barium titanate powder having a mean particle size of 0.32 μm.

TABLE 2

| Sample No. | Mean particle size of barium titanate (μm) | Specific surface area of barium titanate (m²/g) | Specific surface area after calcination (m²/g) | Diameter of zirconia balls (μm) | DC bias characteristics (%) |
|---|---|---|---|---|---|
| 4A | 0.50 | 3.2 | 2.8 | 500 | −19.8 |
| 4B | 0.50 | 3.2 | 2.8 | 200 | −17.8 |
| 4C | 0.50 | 3.2 | 2.8 | 100 | −16.5 |
| 4D | 0.50 | 3.2 | 2.8 | 50 | −16.3 |
| 8A | 0.32 | 4.1 | 3.1 | 500 | −14.8 |
| 8B | 0.32 | 4.1 | 3.1 | 200 | −13.1 |
| 8C | 0.32 | 4.1 | 3.1 | 100 | −12.4 |
| 8D | 0.32 | 4.1 | 3.1 | 50 | −12.2 |

The specific surface area of barium titanate or the ground ceramic raw material was measured as follows.

First, the adsorption amount $V_m$ (cm³/g), which is the amount of He adsorbed to the whole surface in the form of a monomolecular layer, is obtained from the following BET adsorption isotherm equation:

$$x/\{V(1-x)\}=1/(V_m C)+x(C-1)/(V_m C) \quad (1)$$

Specifically, three points are selected in a low relative-pressure region of the actual adsorption isotherm of He in which x is plotted in abscissa and $x/\{V(1-x)\}$ is plotted in ordinate, and a straight line passing through these three points is obtained. At this time, the slope of this straight line is expressed by $(C-1)/(V_m C)$, and the intercept is expressed by $1/(V_m C)$. Thus, from the value of the slope of the straight line and the value of the intercept, the adsorption amount $V_m$ is calculated.

In the above equation (1), x is the relative pressure (adsorption equilibrium pressure/saturated steam pressure), V is the adsorption amount (cm³/g) of He at the relative pressure x, and C is a parameter showing the difference between the adsorption heat in the first layer of He and the adsorption heat in the second layer.

Next, from the monomolecular layer adsorption amount $V_m$ obtained in the above manner, the specific surface area S (m²/g) is obtained, using the following equation:

$$S=sV_m K_A/V_0 \quad (2)$$

In this equation, s is the cross sectional area (m²) of one He molecule, $K_A$ is Avogadro's number, and $V_0$ is the volume of He per 1 mol (22,414 cm³).

According to Table 2, when barium titanate having the same particle size is used as the raw material, the smaller the diameter of the zirconia balls used for the grinding of the calcined powder, the better the DC bias characteristics. Such effect is particularly remarkable when the diameter of the zirconia balls is equal to or less than 400 times the mean particle size of the raw material barium titanate, as in samples Nos. 4B to 4D, 8C, and 8D. It should also be noted that the smaller the mean particle size of the barium titanate, the less the variation thereof, and the better the DC bias characteristics.

Therefore, when the grinding after the calcination is performed using zirconia balls, it is desirable to use zirconia balls, i.e., a grinding media, having a diameter that is equal to or less than 400 times the mean particle size of the starting material barium titanate. Preferably, it is desirable to use a medium having a diameter of 200 µm or less, more preferably 100 µm or less, and still more preferably 50 µm or less.

Also, when the specific surface area of the calcined powder is less than 0.5 time that before the calcination, i.e., when the calcinating temperature is high, the powder is likely to agglomerate. Capacitors manufactured by using such material has poor DC bias characteristics. Therefore, it is desirable that the specific surface area of the powder after the calcination be 0.5 to 1 time that before the calcination.

That is, in order to obtain multilayer ceramic capacitors having excellent DC bias characteristics, it is also effective to give special consideration to the diameter of the zirconia balls in grinding after the calcination, as well as in mixing the starting material.

Although zirconia balls were used as the mixing medium and the grinding medium in this embodiment, any medium such as alumina balls may be used unless it significantly changes the composition of the resultant dielectric layers.

Also, the heat treatment of the powder is performed in a short period of time in such a manner that the heat history is as uniform as possible to avoid the agglomeration.

Further, although the raw material of the dielectric layers of this embodiment included barium titanate as the main component and MgO, $Dy_2O_3$, $Ho_2O_3$ and the like as the sub-components, any raw material powder mainly composed of barium titanate can produce the above-mentioned effects.

In preparing the slurry for forming the ceramic green sheets, the use of the mixing container as illustrated in FIG. 1 causes an increase in the temperature of the dispersion medium of water in the stirring process. If the temperature becomes too high, it becomes difficult to obtain a desired slurry. Therefore, the temperature of the mixture of the water and the ceramic powder is retained at 50° C. or less, and preferably below room temperatures. Also, although the mixing container having the stirring rod as illustrated in FIG. 1 was used in this embodiment, any container may be used if it is capable of mixing the raw material powder with the medium such as zirconia balls, and the stirring rod is not necessarily needed.

In calcining the raw material powder, even if some water remains in the raw material powder, the water evaporates during the calcination, and hence, there is no adverse influence. In the case of not performing the calcination, if the raw material powder after the drying has a large water content, the powder is likely to agglomerate in the subsequent step, which is not preferable. Therefore, in the case of not performing the calcination, it is desirable that the weight of the raw material powder after the drying be equal to or less than 1.08 time, and more preferably 1.05 time, the weight of the raw material powder upon the weighing.

In the above embodiment, the thickness of the dielectric layers was 3 µm. However, as the result of examination of the thicknesses of about 1 µm to 3 µm or less, it has been found that the DC bias characteristics exhibit the same tendency depending on the diameter of the zirconia balls used.

EMBODIMENT 2

First, in the same manner as in samples Nos. 4D and 8D of Embodiment 1, calcined powder is subjected to wet mixing, followed by drying.

Next, a slurry for forming ceramic green sheets is prepared by mixing the dried calcined powder with a binder, etc. First, the dried calcined powder is mixed with alcohol, such as ethanol, to coat the surface of the calcined powder particles with the alcohol.

The calcined powder is then mixed with a solvent of n-butyl acetate, a plasticizer of benzyl butyl phthalate, and a binder of polyvinyl butyral resin.

In this way, by coating the surface of the calcined powder particles with alcohol before mixing it with the solvent, plasticizer, and binder, the agglomeration of the calcined powder particles can be suppressed. However, if the amount of alcohol added is excessive, desired ceramic green sheets cannot be obtained. Therefore, the amount of alcohol added is set so as to be able to suppress the agglomeration of the calcined powder particles and coat the surface thereof. This amount is set to less than the total amount of the binder, solvent, and plasticizer.

Thereafter, the above-mentioned slurry is passed through the mixing container 10 as illustrated in FIG. 1, to obtain a slurry having good dispersibility. At this time, the calcined powder also collides with the zirconia balls and is ground. However, since the diameter of the zirconia balls is much smaller than that of the conventional ones, the excessive grinding of the calcined powder due to the application of an excessive impact can be prevented.

There is a high possibility that the calcined powder used in the slurry for forming the ceramic green sheets has a larger particle size than that of the starting material. Thus, in the same manner as in Embodiment 1, it is also desirable in this embodiment to use zirconia balls of which diameter is equal to or larger than that used for mixing the starting material, in order to grind the calcined powder properly. However, the diameter is preferably 200 µm or less.

Further, in order to obtain the slurry with good productivity, it is desirable to pack the mixing container 10 with spherical zirconia balls most closely. When packed most closely, the zirconia balls theoretically occupy 74% of the internal volume of the mixing container 10. If the zirconia balls occupy less than 60% of the internal volume of the mixing container 10, the powder cannot be mixed sufficiently, resulting in poor dispersibility.

Therefore, the zirconia balls should occupy 60 to 74% of the internal volume of the mixing container 10, and preferably 70 to 74%.

The rotating speed of the stirring rod 12 and the introducing speed of the mixture are controlled such that an excessive force will not apply to the calcined powder.

At this time, the calcined powder also collides with the zirconia balls and is ground. However, since the diameter of the zirconia balls is much smaller than that of the conventional ones, the excessive grinding of the calcined powder due to the application of an excessive impact can be suppressed, so that it is possible to effectively obtain dielectric layers composed of crystal particles having a small variation in particle size.

The slurry obtained in the above manner is applied onto a substrate sheet, such as a polyethylene terephthalate sheet, by the doctor blade process, to form a ceramic green sheet serving as a dielectric layer.

Using ceramic green sheets thus obtained, multilayer ceramic capacitors are obtained in the same manner as in Embodiment 1.

By this method, multilayer ceramic capacitors were manufactured by varying the diameter of the zirconia balls used for the preparation of the slurry for forming the ceramic green sheets. The DC bias characteristics thereof were measured in the same manner as in Embodiment 1. The results thereof are shown in Table 3. Sample Nos. 4D-1 through 4D-4 were manufactured under the same mixing and post-calcination grinding conditions as those of Sample No. 4D. Sample Nos. 8D-1 through 8D-4 were manufactured under the same mixing and post-calcination grinding conditions as those of Sample No. 8D.

TABLE 3

| Sample No. | Mean particle size of barium titanate (μm) | Mean diameter of zirconia balls (μm) | DC bias characteristics (%) |
|---|---|---|---|
| 4D-1 | 0.50 | 500 | −19.8 |
| 4D-2 | 0.50 | 200 | −17.5 |
| 4D-3 | 0.50 | 100 | −16.8 |
| 4D-4 | 0.50 | 50 | −16.3 |
| 8D-1 | 0.32 | 500 | −14.8 |
| 8D-2 | 0.32 | 200 | −12.2 |
| 8D-3 | 0.32 | 100 | −11.8 |
| 8D-4 | 0.32 | 50 | −11.7 |

According to Table 3, when barium titanate having the same particle size is used, the smaller the diameter of the zirconia balls, the better the DC bias characteristics. Such effect is particularly remarkable when the diameter of the zirconia balls is equal to or less than 400 times the mean particle size of the barium titanate, as in samples Nos. 4D-2 to 4D-4, 8D-3, and 8D-4. Also, the smaller the mean particle size of the barium titanate, the less the variation thereof, and the better the DC bias characteristics of the resultant multilayer ceramic capacitors.

Therefore, when the mixing is performed for preparing the slurry for the ceramic sheets using zirconia balls, it is also desirable to use zirconia balls, i.e., a medium, having a diameter that is equal to or less than 400 times the mean particle size of the starting material barium titanate. Specifically, it is desirable to use a small medium having a diameter of 200 μm or less, preferably 100 μm or less, and more preferably 50 μm or less.

In order to obtain multilayer ceramic capacitors having good DC bias characteristics, it is important that the particle size of the barium titanate used as the starting material and its variation are as equivalent to the particle size of the raw material powder for forming the ceramic green sheets and its variation as possible. Therefore, it is also effective to give special consideration to the diameter of the zirconia balls used in mixing the slurry for forming the ceramic green sheets after the calcination, as well as in mixing the starting material.

Further, when a comparison is made among Table 1 with the varied diameters of the balls used for mixing the raw material powder, Table 2 with the varied diameters of the balls used for grinding the calcined raw material, and Table 3 with the varied diameters of the balls used for preparing the slurry for forming the ceramic green sheets, it is found that varying the balls used for mixing the raw material powder in Table 1 has the strongest effects on the DC bias characteristics. That is, from this embodiment, it is found that varying the diameter of the balls used for mixing the raw material powder is the most effective method in terms of DC bias characteristics.

INDUSTRIAL APPLICABILITY

The present invention can provide a multilayer ceramic capacitor having excellent DC bias characteristics.

The invention claimed is:

1. A method of manufacturing a multilayer ceramic capacitor, comprising:
    the first step of introducing a raw material powder mainly composed of barium titanate particles and a dispersion medium into a mixing container, and stirring them with balls serving as a mixing medium, to obtain a slurry containing a raw material powder mixture;
    the second step of drying said slurry, to obtain said raw material powder mixture;
    the third step of forming said raw material powder mixture and a binder into a green sheet;
    the fourth step of alternately layering said green sheet and an internal electrode, to obtain a laminated body; and
    the fifth step of sintering said laminated body,
    wherein said mixing medium has a diameter that is equal to or less than 400 times the mean particle size of the barium titanate particles before the first step.

2. The method of manufacturing a multilayer ceramic capacitor in accordance with claim 1, wherein the mean particle size of said barium titanate particles of the raw material powder is 0.1 to 1 μm, and the diameter of said mixing medium is 200 μm or less.

3. The method of manufacturing a multilayer ceramic capacitor in accordance with claim 1, wherein the amount of said dispersion medium is 1 to 3 times the volume of the raw material powder.

4. The method of manufacturing a multilayer ceramic capacitor in accordance with claim 1, wherein the surface of the raw material powder is coated with the dispersion medium before being brought into contact with the mixing medium in the first step.

5. The method of manufacturing a multilayer ceramic capacitor in accordance with claim 1, wherein the temperature of the dispersion medium is 50° C. or less in the first step.

6. The method of manufacturing a multilayer ceramic capacitor in accordance with claim 1, wherein the amount of said mixing medium occupies 60 to 74% of the internal volume of the mixing container in the first step.

7. The method of manufacturing a multilayer ceramic capacitor in accordance with claim 1, wherein the drying temperature is 120° C. or less in the second step.

8. The method of manufacturing a multilayer ceramic capacitor in accordance with claim 1, wherein the second step further comprises the step of dehydrating the slurry before said drying.

9. The method of manufacturing a multilayer ceramic capacitor in accordance with claim 1, further comprising between the second step and the third step the steps of:
    calcining said mixture;
    stirring the calcined mixture, with a dispersion medium and a grinding medium having a diameter that is equal to or less than 400 times the mean particle size of said barium titanate particles of the raw material powder, to obtain a slurry containing a calcined powder; and drying said slurry, to obtain the calcined powder.

10. The method of manufacturing a multilayer ceramic capacitor in accordance with claim 9, wherein said grinding medium has a diameter that is equal to or larger than the diameter of the mixing medium used in the first step.

11. The method of manufacturing a multilayer ceramic capacitor in accordance with claim 9, wherein the specific surface area of said calcined powder is 0.5 to 1 time the specific surface area of said barium titanate particles of the raw material powder.

12. The method of manufacturing a multilayer ceramic capacitor in accordance with claim 1, wherein the third step comprises the steps of:

stirring said raw material powder mixture, an organic binder and a solvent thereof, with a third mixing medium having a diameter that is equal to or less than 400 times the mean particle size of said barium titanate particles of the raw material powder, to obtain a slurry; and forming a green sheet from said slurry.

* * * * *